March 6, 1934.  W. BAIER  1,950,371
SLIDING ROOF FOR MOTOR VEHICLES
Filed Sept. 14, 1932  4 Sheets-Sheet 1

Inventor:
Wilhelm Baier
by
Attorney.

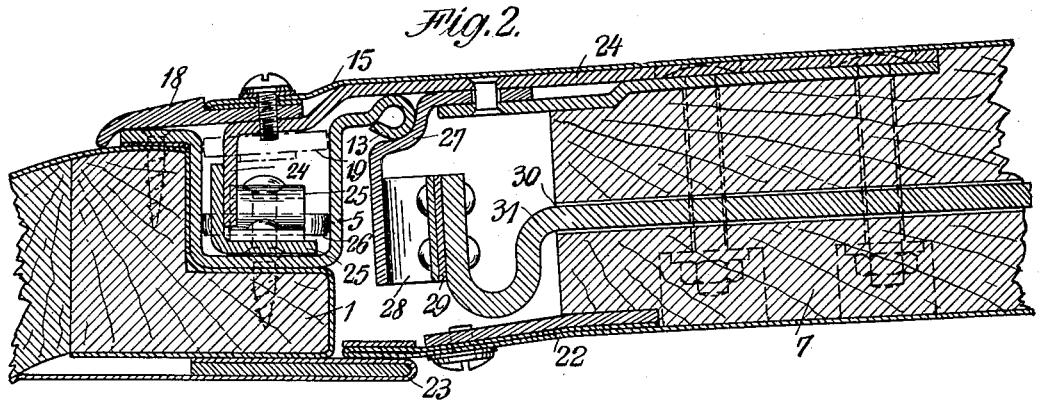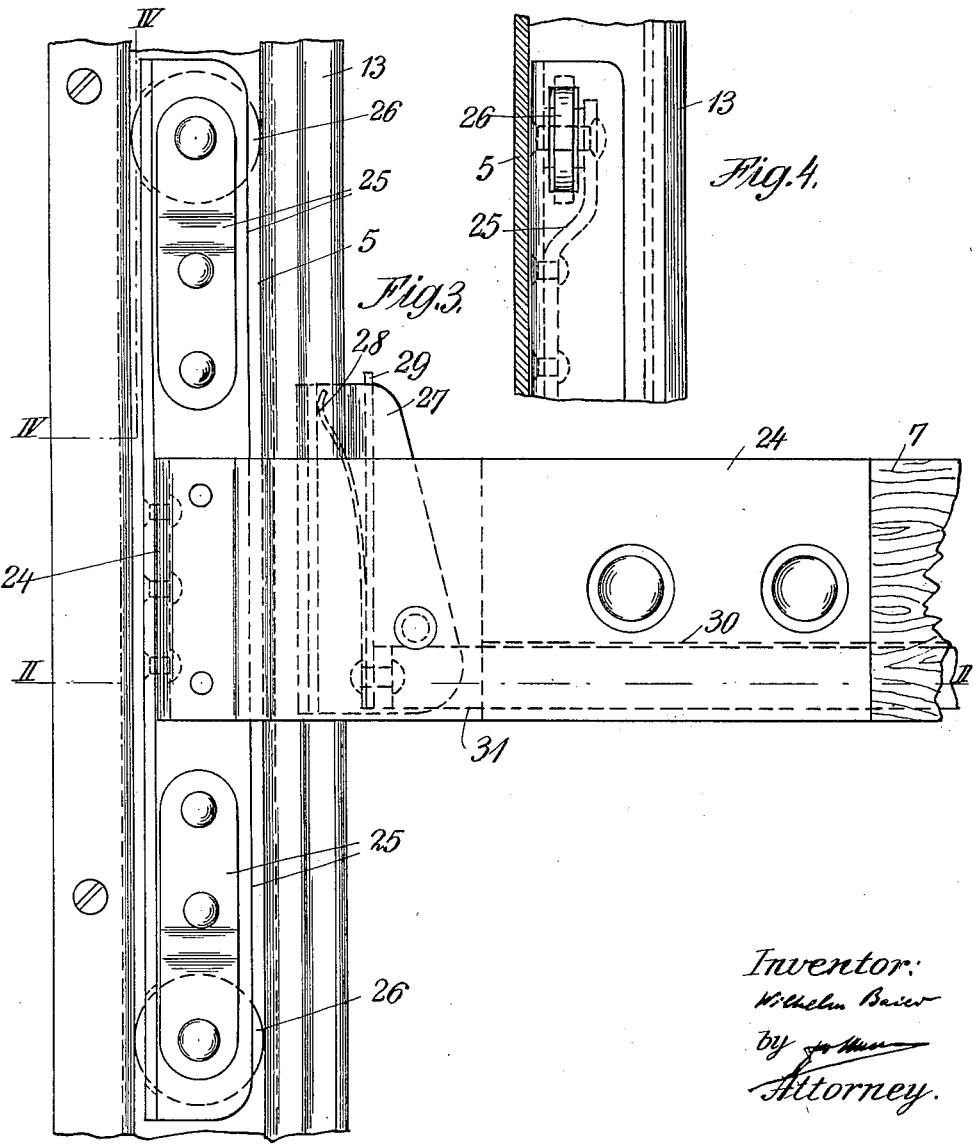

March 6, 1934.  W. BAIER  1,950,371
SLIDING ROOF FOR MOTOR VEHICLES
Filed Sept. 14, 1932  4 Sheets-Sheet 3

Inventor:
Wilhelm Baier
by
Attorney.

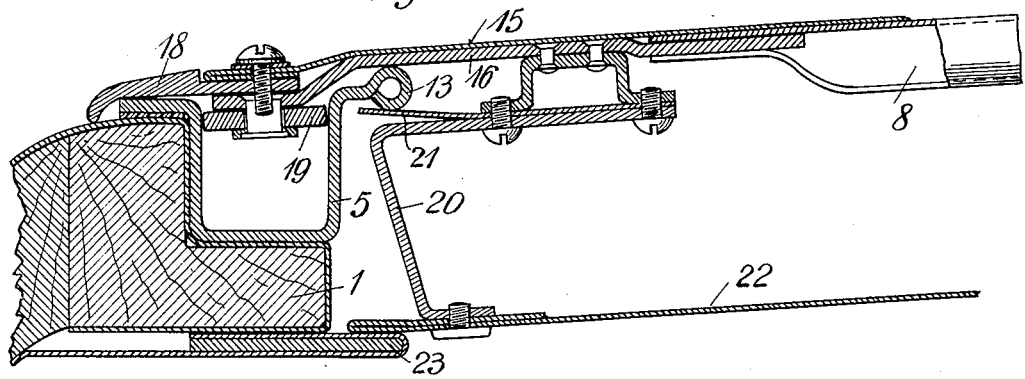
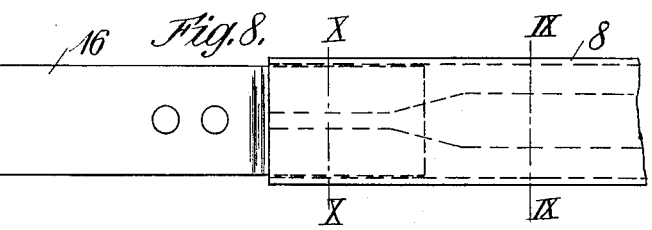
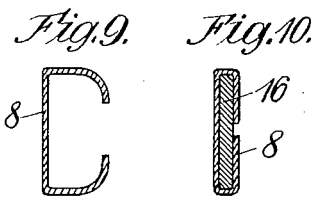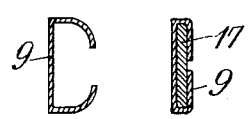
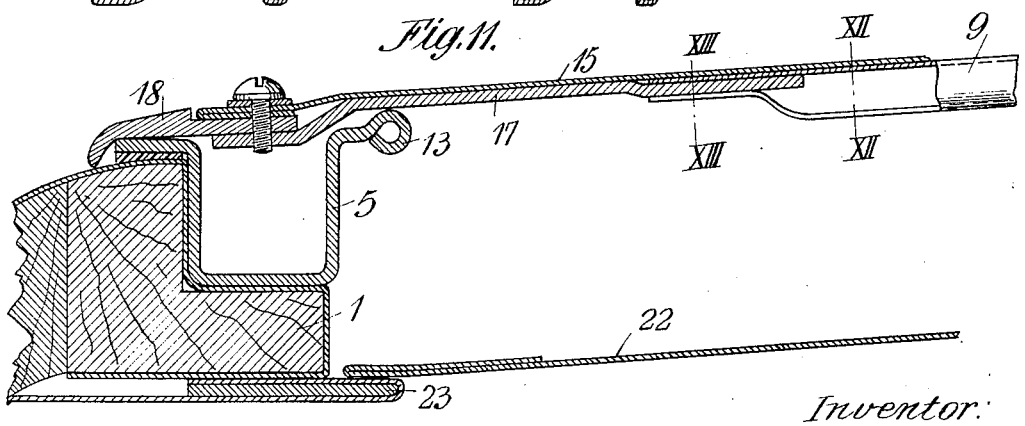

Patented Mar. 6, 1934

1,950,371

UNITED STATES PATENT OFFICE 1,950,371

SLIDING ROOF FOR MOTOR VEHICLES

Wilhelm Baier, Stockdorf, near Munich, Germany

Application September 14, 1932, Serial No. 633,149
In Germany November 28, 1931

3 Claims. (Cl. 296—137)

This invention relates to a sliding roof for motor vehicles in which a plurality of hoops are guided in U-shaped guides on both sides of a rectangular roof aperture, which hoops are connected to a foldable roofing material, the front hoop being constructed as closing hoop and adapted to be connected to a transverse beam of the aperture for the purpose of closing the sliding roof. The invention consists substantially in that, for the purpose of the free sliding of the roof, the hoops have horizontal rollers running within the two U-shaped guides and bearing laterally outside the U-shaped guides, on a slide guide, and that the closing hoop, serving for effecting the opening and closing of the roof, is constructed as carriage with roller supports projecting at right angles on both sides at its two ends. Moreover, in the closing hoop a fixing device is fitted having a lock in the longitudinal centre of the hoop, by means of which lock a rod system extending towards both ends of the closing hoop can be pressed against the slide guides of the hoop in opposition to the action of springs, so that the hoop can be fixed in any position on its slide guides.

An embodiment of the invention is illustrated by way of example in the accompanying drawings in which:

Fig. 2 is a section through the closing hoop taken on line II—II of Figs. 1 and 3.

Fig. 3 is a part top plan view of Fig. 2.

Fig. 4 is a part section on line IV—IV of Fig. 3.

Fig. 7 is a longitudinal section of a guide hoop taken on line VII—VII of Fig. 1.

Fig. 8 is a top plan view of Fig. 7.

Fig. 9 is a cross section on line IX—IX of Fig. 8.

Fig. 10 is a cross section on line X—X of Fig. 8.

Fig. 11 is a longitudinal section of the folding hoop taken on line XI—XI of Fig. 1.

Fig. 12 is a cross section on line XII—XII of Fig. 11.

Fig. 13 is a cross section on line XIII—XIII of Fig. 11.

Figure 1:
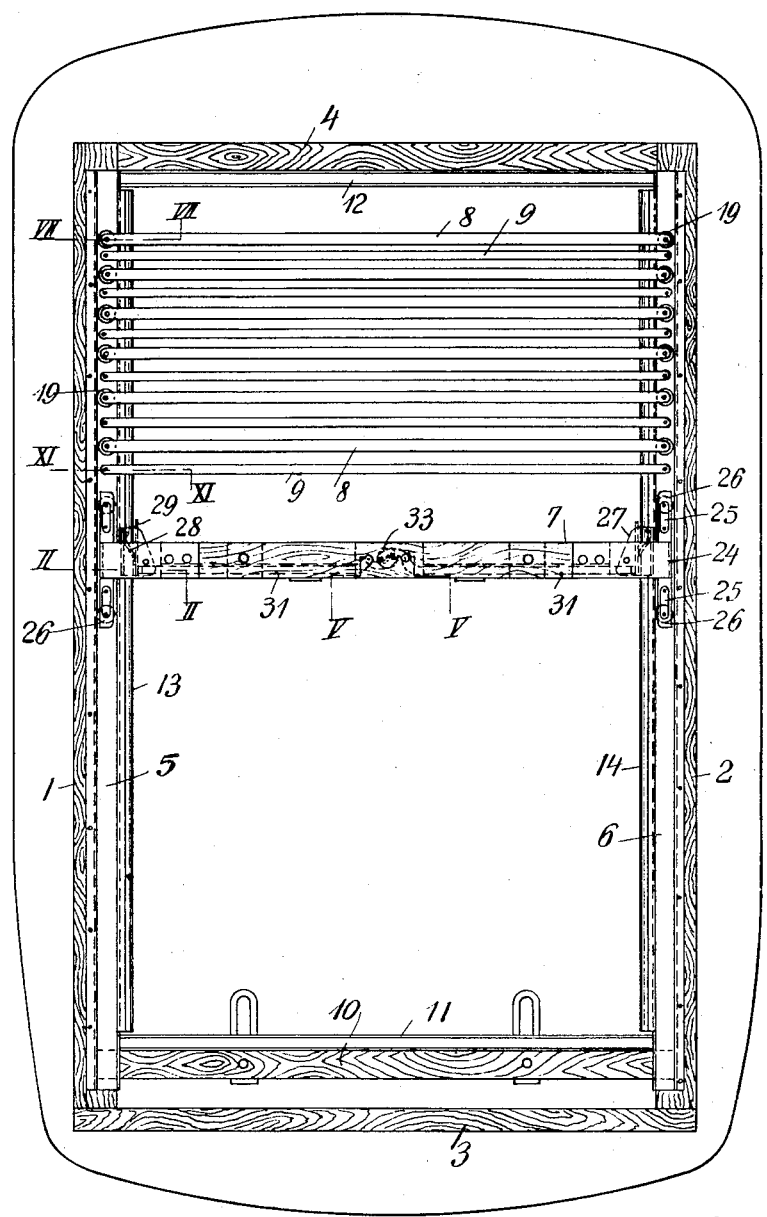
Fig. 1 shows the sliding roof in top plan view with the roofing material omitted. The remaining figures are on a larger scale.
Figure 5:
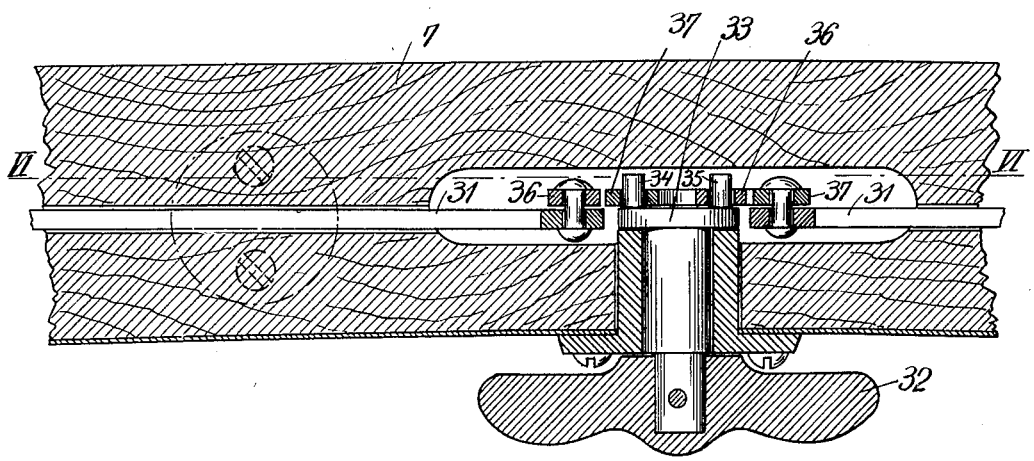
Fig. 5 is a part section through the closing hoop taken on line V—V of Fig. 1.
Figure 6:
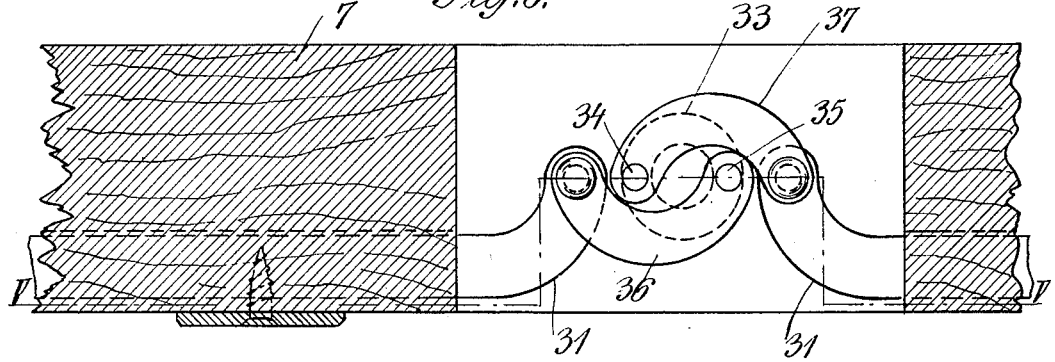
Fig. 6 is a top plan view of Fig. 5.

A wooden frame 1, 2, 3, 4 is fitted in a rectangular aperture in the roof of the vehicle. The two longitudinal bars 1 and 2 carry U-shaped guides 5 and 6 respectively which serve both for guiding transverse hoops 7, 8, 9 connected to foldable roofing material and at the same time as water gutter. In the front end of the frame a transverse beam 10 is fixed, to which the first or foremost transverse hoop 7 is detachably connected when closing the sliding roof. This transverse beam 10 and the transverse arm 4 of the frame are provided with water gutters 11 and 12 respectively. When the roof is arranged for opening towards the front, the transverse beam 10 and the closing hoop 7 are at the rear end of the roof aperture. When the roof is to open both towards the front and rear, the transverse beam 10 is arranged in the longitudinal centre of the roof aperture and two closing hoops are arranged one on each side of the beam. The sliding roof is opened and closed by the closing hoop 7, which is always situated nearest the transverse beam 10, and the roof is constructed in a particular manner in order to prevent binding and jamming. The U-shaped guides 5 and 6 are provided on their inner arms, that is the arms situated nearer the roof aperture, with a slide guide 13 and 14 respectively, these slide guides being produced in that the edge of the groove is bent inwards at an angle and rolled to form a longitudinal bead. All the hoops bear and slide at their ends on these longitudinal beads 13 and 14. The inner arms of the U-shaped guides or channels having the guide beads 13 and 14 respectively are higher than the outer arms, so that rain flowing in from the outer side is conducted into the channels by the inner arms thereof.

The hoops 8 are so-called guide hoops, between which the folds of the roofing material form. A so called folding hoop 9 is situated between every two guide hoops. These folding hoops 9 are likewise connected to the roofing material and cause a bulging and folding over in outward direction of the folds of the roofing material 15, in lifting from the slide guides 5 and 6. The guide hoops 8 and also the folding hoops 9 are made of channel metal bars, on the wide web of which the roofing material 15 is fixed, and the arm ends of these hoops 8 and 9 are bent inwards as shown in Figs. 9 and 12. Thus, the stability of the hoops is attained with smaller dimensions, and moreover the rounded edges of the folding hoops 9 prevent damaging of the roofing material surrounding the U-arms when the folds are being formed. In each of the ends of the hoops 8 and 9 straps 16 and 17 respectively are rolled and pressed. The hoops bear and slide on the longitudinal beads 13 and 14 of the channels by means of these straps. A cover bar 18 made of rubber provided on the edges of the foldable roofing material 15 and covering the guides 5, 6 is fixed on the ends of the hoops.

The guide hoops 8 carry on the ends of their straps 16 guide rollers 19 running horizontally in the guides 5 and 6 respectively, and on the straps 16 a lower strap 20 (Fig. 7) is also arranged with a spring 21 in such a manner that the lower strap 20 is pressed from below by means of its spring 21 on to the longitudinal beads 13 and 14 of the U-guides 5 and 6 respectively. The vertical guiding of the hoops 8 is effected by means of this upper strap 16 and lower strap 20. The lower straps 20 also carry at the same time the edge of the foldable lining material 22 in the interior of the vehicle. The edge of this lining material extends laterally over a reinforced cloth strip 23 rigidly connected to the lateral frame arms 1 and 2.

The closing hoop 7 consists of a wooden bar, which has on each end a strap 24 downwardly bent into the guides 5 and 6 respectively. The lateral rubber cover bars 18 on the roofing material 15 are rigidly connected to these straps 24. In each of the U-guides 5 and 6 the downwardly bent part of the strap 24 carries carrier element 25 projecting at right angles on both sides directed towards the hoop and having each a horizontal guide roller 26 on each end running in the U-guides on both walls, so that the hoops form a carriage with four horizontal rollers. As these four rollers bear against both walls of the U-shaped guides, binding or jamming of the carriage in the event of one sided pull or push being exerted on the hoops is prevented. The rollers 26 and the carriers 25 lie so low down in the guides 5 and 6, that they are not in the way of rollers 19 of the guide hoop 8. Consequently, the closing hoop 7 can be pushed close to the adjacent guide hoop 8 when completely opening the roof. Moreover the closing hoop, owing to the two-sided arrangement of the roller carrier 25, can be employed in the same way without alteration whether the roof is slidable towards the rear, front or middle.

The guide strap 24 carries on its under side at each end of the closing hoop a hinged oscillatable angle strap 27 which partly surrounds from below the longitudinal bead 13 or 14 of the guides 5 and 6 respectively and is pressed thereon by means of a weak spring 28. This spring 28 only serves to prevent the angle strap 27 from swinging off the bead 13 or 14. The spring 28 is not rigidly connected to the angle strap 27 and a strong second spring 29 bears on to the spring 28, and the two springs are connected by a device by means of which the closing hoop can be fixed in any adjusted position. At each end of the hoop a thrust rod 31 embedded in a lateral longitudinal groove 30 of the hoop is connected to each hoop. These thrust rods 31 are united in a lock in the longitudinal middle of the hoop. This lock consists of a rotary handle 32. On the under side of the closing hoop the pivot pin of the handle carries a disc 33 in a horizontal slot in the hoop. Two diametrically opposite pins 34, 35 are mounted on this disc 33, a curved link 36 or 37 is mounted at one end of each of the pins 34, 35; these links are hingedly connected at their other end to the thrust rods 31 so that the two links engage one over the other on the disc whereas, if the disc 33 is turned through a half revolution, the position of the pins on the disc is reversed and the two links are in alinement. Thus, the two thrust rods 31 are pushed outwards and press with their outer ends so strongly against the double springs 28, 29 of the angle strap 27 that this latter is pressed tightly against the longitudinal beads 13, 14 of the U-shaped guides thereby fixing the closing hoop. The sliding roof can be opened to any desired extent by this arrangement and fixed in any adjusted position. This fixing of the closing hoop prevents the hoop from rattling when the vehicle is travelling, the same objections being overcome in the case of the guide hoops 8 by means of the springs 21.

I claim:—

1. A sliding roof for motor vehicles, comprising in combination with the roof of the vehicle having a rectangular aperture, U-shaped guides on the longitudinal edges of the aperture in said roof, a plurality of guide hoops, folding hoops and a closing hoop, the ends of said closing hoop being downwardly bent at an angle, the downwardly bent ends projecting in said U-shaped guides and having supports projecting at right angles on both sides, horizontal guide rollers one on each end of said carrier, said rollers fitting between the walls of said U-shaped guides, and horizontal guide rollers on said guide hoop, the guide rollers on said closing hoop lying lower in said guides than the guide rollers on said guide hoops.

2. A sliding roof for motor vehicles, comprising in combination with the roof of the vehicle having a rectangular aperture, U-shaped guides on the longitudinal edges of the aperture of said roof, a plurality of guide hoops, folding hoops and a closing hoop, the inner wall of said guides being higher than the outer and its upper edge bent down horizontally in inward direction towards the middle of the roof and terminating in a tubular bead, slide straps on each end of each hoop and engaging around the longitudinal bead on said U-shaped grooves from above and below, horizontal guide rollers on the end of the upper slide straps of said guide hoops and said closing hoop, said rollers fitting in said U-shaped guides, and a carrier projecting on both sides on the ends of the upper slide straps of said closing hoop and carrying at its ends the guide roller of said closing hoop.

3. A sliding roof for motor vehicles, comprising in combination with the roof of the vehicle having a rectangular aperture, U-shaped guides on the longitudinal edges of the aperture of said roof, a plurality of guide hoops, folding hoops and a closing hoop, the inner wall of said guides being higher than the outer and its upper edge being bent horizontally inwards towards the middle of the roof and terminating in a tubular bead, slide straps on each end of each of said hoops engaging from above and below around said beads on said U-shaped guides, the lower slide straps on said closing hoop being hingedly mounted on each end thereof, springs pressing said lower straps against said beads, means for increasing the pressure exerted by said springs and clamping said hingedly mounted slide straps against said longitudinal beads, horizontal guide rollers on the ends of said guide hoops and of said closing hoop, fitting in said U-shaped guides, a carrier projecting at right angles on both sides from each end of said closing hoop and carrying at each end one of said guide rollers.

WILHELM BAIER.